United States Patent
Dunne et al.

(12) 
(10) Patent No.: US 10,893,150 B2
(45) Date of Patent: *Jan. 12, 2021

(54) CODEC SELECTION AND USAGE FOR IMPROVED VOIP CALL QUALITY

(71) Applicants: International Business Machines Corporation, Armonk, NY (US); Waterford Institute of Technology, Waterford (IE)

(72) Inventors: Jonathan Dunne, Dungarvan (IE); Paul B. French, Cork (IE); James P. Galvin, Jr., Georgetown, KY (US); Mohamed Adel Mahmoud, Ain Shams (EG); Patrick J. O'Sullivan, Ballsbridge (IE)

(73) Assignees: INTERNATIONAL BUSINESS MACHINES CORPORATION, Armonk, NY (US); WATERFORD INSTITUTE OF TECHNOLOGY, Waterford (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,153

(22) Filed: Aug. 6, 2018

(65) Prior Publication Data

US 2018/0343344 A1 Nov. 29, 2018

Related U.S. Application Data

(63) Continuation of application No. 15/414,032, filed on Jan. 24, 2017, now Pat. No. 10,044,875, and a (Continued)

(51) Int. Cl.
*H04M 7/00* (2006.01)
*H04L 29/08* (2006.01)
(Continued)

(52) U.S. Cl.
CPC ...... *H04M 7/0072* (2013.01); *H04L 41/5067* (2013.01); *H04L 65/1083* (2013.01);
(Continued)

(58) Field of Classification Search
None
See application file for complete search history.

(56) References Cited

U.S. PATENT DOCUMENTS 6,798,786 B1 * 9/2004 Lo ................... H04L 12/6418
370/329
7,002,992 B1 2/2006 Shaffer et al.
(Continued)

OTHER PUBLICATIONS

U.S. Appl. No. 14/065,707, Non-Final Office Action, dated May 6, 2015, 10 pg.
(Continued)

*Primary Examiner* — Anh Vu H Ly
*Assistant Examiner* — Hector Reyes
(74) *Attorney, Agent, or Firm* — Cuenot, Forsythe & Kim, LLC

(57) ABSTRACT

A method of implementing calls includes identifying a call scheduled for a time in the future from an electronic calendar associated with a user and prior to the call, ordering a plurality of codecs used by an Internet Protocol (IP) phone of the user for the scheduled call. The method further includes, during the call and using a processor, calculating a mean opinion score for the call and storing the mean opinion score as part of call data for the call within a data storage device comprising historical call data.

18 Claims, 3 Drawing Sheets

Related U.S. Application Data continuation of application No. 15/414,102, filed on Jan. 24, 2017, now Pat. No. 10,044,876, which is a continuation of application No. 14/227,293, filed on Mar. 27, 2014, now Pat. No. 9,602,572, said application No. 15/414,032 is a continuation of application No. 14/065,707, filed on Oct. 29, 2013, now Pat. No. 9,602,571, said application No. 14/227,293 is a continuation of application No. 14/065,707.

(51) Int. Cl.
*H04L 29/06* (2006.01)
*H04L 12/24* (2006.01)

(52) U.S. Cl.
CPC .............. *H04L 65/80* (2013.01); *H04L 67/22* (2013.01); *H04L 67/325* (2013.01)

(56) References Cited

U.S. PATENT DOCUMENTS

| | | | |
|---|---|---|---|
| 8,032,353 | B1 | 10/2011 | Baron et al. |
| 8,059,656 | B1* | 11/2011 | Telikepalli .......... H04L 65/1069 370/395.2 |
| 8,374,587 | B2 | 2/2013 | Kampmann et al. |
| 8,811,177 | B1 | 8/2014 | Toudeh-Fallah et al. |
| 9,602,571 | B2 | 3/2017 | Dunne et al. |
| 9,602,572 | B2 | 3/2017 | Dunne et al. |
| 10,044,875 | B2 | 8/2018 | Dunne et al. |
| 10,044,876 | B2 | 8/2018 | Dunne et al. |
| 2007/0195707 | A1* | 8/2007 | Cidon .................... H04L 43/50 370/252 |
| 2007/0291734 | A1* | 12/2007 | Bhatia ............... H04L 29/06027 370/352 |
| 2009/0185665 | A1 | 7/2009 | Chen |
| 2009/0237240 | A1 | 9/2009 | Leung et al. |
| 2010/0260074 | A1 | 10/2010 | Blouin et al. |
| 2011/0249572 | A1 | 10/2011 | Singhal et al. |
| 2011/0254961 | A1 | 10/2011 | Putnam et al. |
| 2012/0044931 | A1 | 2/2012 | Harper et al. |
| 2012/0069969 | A1* | 3/2012 | Lager ...................... H04L 43/50 379/1.03 |
| 2012/0113949 | A1 | 5/2012 | Kim et al. |
| 2012/0294164 | A1 | 11/2012 | Leventu |
| 2013/0155866 | A1* | 6/2013 | Sun ........................ H04L 65/605 370/241 |
| 2015/0071297 | A1* | 3/2015 | Tsoutsaios ................ H04J 3/22 370/401 |
| 2015/0117232 | A1 | 4/2015 | Dunne et al. |
| 2015/0117236 | A1 | 4/2015 | Dunne et al. |
| 2017/0134585 | A1 | 5/2017 | Dunne et al. |
| 2017/0134586 | A1 | 5/2017 | Dunne et al. |

OTHER PUBLICATIONS

U.S. Appl. No. 14/065,707, Non-Final Office Action, dated Nov. 20, 2015, 12 pg.
U.S. Appl. No. 14/065,707, Final Office Action, dated Jul. 6, 2016, 15 pg.
U.S. Appl. No. 14/065,707, Notice of Allowance, dated Nov. 3, 2016, 7 pg.
U.S. Appl. No. 14/227,293, Non-Final Office Action, dated May 22, 2015, 12 pg.
U.S. Appl. No. 14/227,293, Non-Final Office Action, dated Nov. 23, 2015, 12 pg.
U.S. Appl. No. 14/227,293, Final Office Action, dated Jul. 6, 2016, 14 pg.
U.S. Appl. No. 14/227,293, Notice of Allowance, dated Nov. 9, 2016, 7 pg.
U.S. Appl. No. 15/414,032, Non-Final Office Action, dated Jun. 15, 2017, 12 pg.
U.S. Appl. No. 15/414,032, Final Office Action, dated Dec. 7, 2018, 13 pg.
U.S. Appl. No. 15/414,032, Notice of Allowance, dated Apr. 5, 2018, 5 pg.
U.S. Appl. No. 15/414,102, Non-Final Office Action, dated Jun. 29, 2017, 13 pg.
U.S. Appl. No. 15/414,102, Final Office Action, dated Dec. 6, 2017, 15 pg.
U.S. Appl. No. 15/414,102, Notice of Allowance, dated Mar. 28, 2018, 5 pg.

\* cited by examiner

CODEC SELECTION AND USAGE FOR IMPROVED VOIP CALL QUALITY

BACKGROUND

Voice over Internet Protocol (IP), referred to as "VoIP," is a collection of technologies for delivering voice communications and/or multi-media sessions over an IP network. Whereas a conventional telephone system sends data over a circuit-switched network referred to as the Public Switched Telephone Network (PSTN), a VoIP telephone system sends data in the form of IP packets over a packet-switched network.

Like other real-time applications, VoIP requires minimum service guarantees that typically surpass the "best-effort" structure of modern IP networks. Delays as small as approximately 100 milliseconds can be detected by humans. Such delays can impair the interactivity of a conversation conducted over a call. Various factors relating to the network itself such as packet loss and packet delay are known to affect the perceived quality of a VoIP call. In addition, other factors relating to the VoIP phone itself also play a role perceived quality of a VoIP call.

SUMMARY

A method includes identifying a call scheduled for a time in the future from an electronic calendar associated with a user and, prior to the call, ordering a plurality of codecs used by an Internet Protocol (IP) phone of the user for the scheduled call. The method further includes, during the call and using a processor, calculating a mean opinion score for the call and storing the mean opinion score as part of call data for the call within a data storage device comprising historical call data.

A system includes a processor programmed to initiate executable operations. The executable operations include identifying a call scheduled for a time in the future from an electronic calendar associated with a user and, prior to the call, ordering a plurality of codecs used by an IP phone of the user for the scheduled call. The executable operations further include, during the call, calculating a mean opinion score for the call and storing the mean opinion score as part of call data for the call within a data storage device comprising historical call data.

A computer program product includes a computer readable storage medium having program code stored thereon. The program code is executable by a processor to perform a method. The method includes identifying, using the processor, a call scheduled for a time in the future from an electronic calendar associated with a user and, prior to the call, ordering a plurality of codecs used by an IP phone of the user for the scheduled call using the processor. The method further includes, during the call and using the processor, calculating a mean opinion score for the call and storing, using the processor, the mean opinion score as part of call data for the call within a data storage device comprising historical call data.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to codec selection for improved Voice over Internet Protocol (VoIP) call quality. In accordance with the inventive arrangements disclosed herein, the codec that is to be utilized by a VoIP phone for conducting a particular VoIP call can be selected prior to implementation of the actual call. In one aspect, the codec selection process is implemented based upon historical call data reflecting one or more mean opinion scores (MOSs) associated with various codecs available to the IP phone for use in making the VoIP call. In another aspect, the codec selection process is implemented based upon the determination of an emulated MOS for the various codecs available to the IP phone for making the VoIP call.

In either case, whether using one or more MOS(s) retrieved from historical call data and/or one or more emulated MOS(s), the list of available codecs for the VoIP call can be ordered. For example, codecs can be ordered in accordance with descending MOS, whether actual or emulated, so that the codec with the highest MOS is listed first or given the highest priority for use in making the call. As the call is conducted, one or more actual MOS(s) are calculated for the call. The calculated MOS(s) for the call may be stored as part of call data for the call within the historical call data. Further aspects of the inventive arrangements will be described in greater detail with reference to the drawings.

Figure 1:
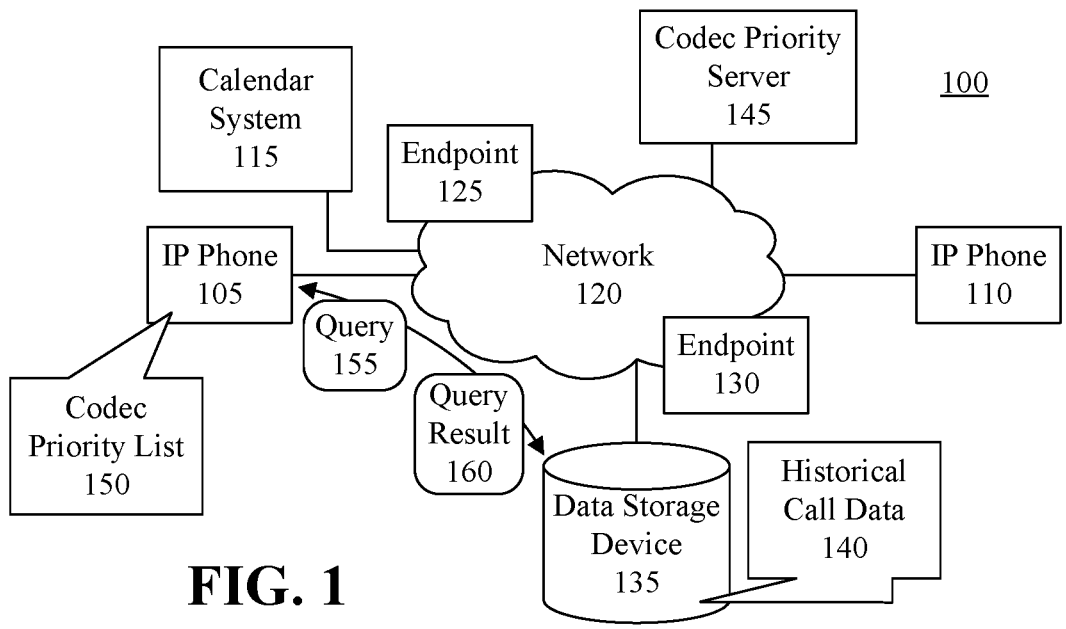
FIG. 1 is a block diagram illustrating an exemplary network communication system.

FIG. 1 is a block diagram illustrating an exemplary network communication system 100. Network communication system 100 includes an IP phone 105, an IP phone 110, a calendar system 115, and a network 120. Network communication system 100 further may include one or more optional elements such as endpoints 125 and 130, a data storage device 135, and a codec priority server 145.

IP phones 105 and 110 may be implemented as any of a variety of different devices and/or systems. As defined within this disclosure, an "IP phone" is a device or system that is configured to conduct VoIP calls. An IP phone may be implemented in any of a variety of different form factors, whether as a standalone device, e.g., a telephone handset or other device with dedicated electronic circuitry, a mobile communication device executing IP phone software such as a smart phone, a computer system such as a laptop, desktop, tablet, or the like executing IP phone software, etc. Regardless, the IP phone includes transducers for generating sound from received signals and for converting received sound into signals for transmission.

A "VoIP call" refers to a communication session between two or more IP phones. A VoIP call is conducted over a packet switched network using IP protocols. Examples of a VoIP call include, but are not limited to, an audio only communication session between two or more IP phones, a multimedia session between two or more IP phones where visual and/or audiovisual material is exchanged, e.g., a videoconference, screen sharing session, or the like. For the remainder of this disclosure, since network communication system 100 is described as an IP-based system, the term "call" is used interchangeably with the phrase "VoIP call."

IP phones 105 and 110 include a plurality of different codecs. As used within this disclosure, a "codec" is a device that is configured to compress, decompress, or both compress and decompress a digital stream of data. In the context of this disclosure, the digital stream of data is data for a call. In one aspect, a codec may be implemented as dedicated circuitry that is configured to perform compression and/or decompression functions upon a digital stream of data. An IP phone, for example, may include a plurality of different codecs in the form of different circuits, e.g., application-specific integrated circuits or the like, that may be selected and applied to process a given digital stream of data.

In another aspect, a codec may be implemented as a processor that executes a codec program, i.e., program code. The processor, in executing the codec program, is configured to compress and/or decompress a digital stream of data. One or more different codec programs may be stored and selected for execution on a single processor. Alternatively, a plurality of processors may be used where each processor is configured to execute at least one different codec program. In any case, IP phones 105 and 110 can include a plurality of codecs, whether implemented as dedicated circuitry, a processor or processors executing codec program code, or a combination thereof.

In addition, an IP phone such as IP phone 105 includes a codec priority list 150. The codec priority list for IP phone 110 is not shown for ease of illustration. Codec priority list 150 specifies each different codec that is implemented within IP phone 105 and, as such, is available for use during a call. Typically, when establishing a call, IP phone 105 communicates with another node in the call, whether IP phone 110 or an intermediary node, e.g., endpoints 125 and/or 130, to determine a codec that both nodes have in common that may be used for the call. Codec priority list 150 lists codecs preferred for usage by IP phone 105 with the most preferred codec at the top of the list and the least preferred codec at the bottom of the list. In determining a common codec for purposes of the VoIP call, each IP phone traverses its respective list from top down or from most preferred codec to least preferred codec until a match is found. In conventional IP phone systems, codec priority list 150 is static.

Calendar system 115 is implemented as a data processing system executing calendar program code. In one aspect, calendar system 115 is implemented as a server or other computing system. While IP phone 105 is illustrated as being separate from calendar system 115, it should be appreciated that in some cases IP phone 105 and calendar system 115 may be implemented within the same computing and/or communication device. For example, a smart phone or a computer system may include both an IP phone application and a calendar application that may communicate with one another within the device without having to utilize network 120.

As pictured, IP phone 105, IP phone 110, and calendar system 115 are coupled to network 120 and may communicate with one another through network 120. Network 120 is the medium used to provide communications links between various devices and data processing systems connected together within network communication system 100. Network 120 may include connections, such as wire, wireless communication links, or fiber optic cables. Network 120 can be implemented as, or include, any of a variety of different communication technologies such as a wide area network (WAN), a local area network (LAN), a wireless network, a mobile network, a Virtual Private Network (VPN), the Internet, or the like.

In operation, IP phone 105 queries calendar system 115 to identify a call scheduled for a time in the future. IP phone 105 can query calendar system 115 for a call scheduled for a time in the future that involves a user associated with IP phone 105. Thus, the particular calendar within calendar system 115 that is queried is the calendar associated with the user of IP phone 105.

Responsive to identifying a scheduled call, IP phone 105 orders the plurality of codecs available to IP phone 105. Codec selection within IP phone 105 may significantly influence perceived quality of a call. IP phone 105 orders the codecs, e.g., the codecs specified in codec priority list 150, at least in part, based upon information for the scheduled call obtained from calendar system 115. In one aspect, the codecs are ordered according to scores associated with one or more or each codec specified on codec priority list 150.

For example, as noted, IP phone 105 can identify a call scheduled in the future from calendar system 115. IP phone 105 can obtain information relating to the scheduled call such as the call participants, participant phone numbers if available, participant IP addresses if available, the date and/or time of the call, the duration of the call, etc. Information about the scheduled call can be used by IP phone 105 as arguments in a query 155 that is submitted to data storage device 135. Data storage device 135 searches historical call data 140 for a match and returns a query result 160 specifying either matching call data, e.g., entries from historical call data 140, or an indicator that no matching call data was located to IP phone 105.

In one aspect, historical call data 140 includes records of prior calls. Each record, for example, can correspond to one call. An example of a record within historical call data 140 can specify information such as the data of a call, the start and/or end time of the call, the duration of the call, the participants on the call, the geographic location of participants on the call, the IP addresses and/or phone numbers of participants on the call, ports and/or subnets used by participants of the call, the codec used during the call, a score indicating quality of the call using the codec, type of IP phones used by participants, IP software used by the IP phones, and/or the like. Any combination of the aforementioned call parameters may be used as an argument, or as arguments, in searching historical call data 140 for matching call data. Specific examples of query 155 may include querying historical call data 140 using the participants of the call, including the time of day or a time range, etc.

In another aspect, the score that is used to indicate call quality and stored is a Mean Opinion Score (MOS). A MOS is a numerical indication of call quality. Typically, a MOS is expressed as a number from 1 to 5, where 1 indicates the worst quality and 5 indicates best quality. A MOS indicates call quality by assessing the quality of the media received after being transmitted through network 120, which includes compression and decompression by codecs in IP phones. While MOSs may be determined subjectively by human beings, a MOS also may be determined or calculated using an automated testing system whether for audio, video, or both.

Other exemplary scoring mechanisms that may be used can include, but are not limited to, Perception Evaluation of Speech Quality (PESQ), Perceptual Evaluation of Video Quality (PEVQ), PNSQ, etc. These exemplary scoring mechanisms are relative in nature. It should be appreciated that such scoring mechanisms may be used to derive a MOS or may be mapped to a MOS, which is an absolute score. Accordingly, unless otherwise indicated, the phrase "Mean Opinion Score" or the acronym "MOS" is used to refer to quality of a call, whether audio, video, or both.

A MOS for a call, whether calculated for an actual call or an emulated call, accounts for network metrics including, but not limited to, packet delay, packet loss, jitter, available bandwidth, or the like. Further, the MOS for a call accounts for parameters of the particular codec that is used including, but not limited to, playout buffer size, error concealment mechanisms used, required bandwidth of the codec, the sample period used by the codec, the maximum achieved quality of the codec, etc.

Query result 160 specifies one or more codecs and a MOS for each codec. Each codec specified within query result 160 is a codec for which call data exists in historical call data 140 that matches the arguments of query 155. IP phone 105 orders, or re-orders as the case may be, codec priority list 150 in accordance with query result 160. IP phone 105 orders codec priority list 150 according to MOS for each codec from high MOS to low MOS, where higher MOSs indicate higher call quality.

Subsequently, when IP phone 105 makes a call to IP phone 110, the particular codec that is used is selected based upon the priority specified within codec priority list 150. As discussed, IP phone 105 compares codec priority list 150 with a similar list of codecs from IP phone 110 to determine a matching codec. It should be appreciated that IP phone 110 can undertake a similar or same procedure as IP phone 105 to order the codec priority list stored therein.

In another aspect, the codecs are ordered according to one or more emulated calls using the available codecs through which call quality is assessed. For example, responsive to identifying a scheduled call as previously described, IP phone 105 can emulate a call to IP phone 110. For example, a call can be emulated for each different codec included in IP phone 105. For each emulated call using a different codec, an emulated MOS is calculated. IP phone 105 can order codec priority list 150 according to the emulated MOSs where the codec with the highest emulated MOS is preferred over a codec with a lower emulated MOS.

In a further aspect, call emulation can be performed in instances where query result 160 indicates that no matches were located within historical call data 140 in response to query 155. In that case, call emulation and emulated MOSs would only be utilized by IP phone 105 for purposes of ordering coded priority list 150 after determining that historical call data 140 includes no matching call data.

In the case where call emulation is utilized, both IP phone 105 and IP phone 110 must be configured to support call emulation. In cases where a particular IP phone to be involved in a future scheduled call does not support call emulation, call emulation can be performed by a different network node such as a node that supports call emulation that is located near, or within a predetermined geographic distance, of the IP phone not supporting call emulation. For example, the node used to perform call emulation in place of one or more of the IP phones intended to participate on the scheduled call may be a node that is geographically closest to the particular IP phone that does not support call emulation.

For example, referring to FIG. 1, in the case where IP phone 105 does not support call emulation, endpoint 125 may be used as a proxy for IP phone 105 and implement call emulation at the request of IP phone 105. Similarly, in the event that IP phone 110 does not support call emulation, endpoint 130 may be used as a proxy for IP phone 110 and implement call emulation at the request of IP phone 110. For example, endpoints 125 and/or 130 may be edge servers, routers, or the like of a network or local network to which either IP phone 105 and/or IP phone 110 belong. Thus, call emulation may be performed between IP phone 105 and IP phone 110, between IP phone 105 and endpoint 130, between endpoint 125 and IP phone 110, or between endpoint 125 and endpoint 130.

In still another aspect, rather than initiating and/or performing the various operations described within IP phone 105, one or more or all of the operations may be performed and/or initiated by a centralized computing node illustrated as codec priority server 145. For example, codec priority server 145 can be implemented to provide a codec priority service and search calendar system 115 for future scheduled calls. Responsive to identifying such a call, codec priority server 145 may query data storage device 135 for historical call information and provide a query result to one or more of IP phones 105 and/or 110. Further, codec priority server 145 may initiate call emulation for a scheduled call as previously described and under the circumstances previously described.

Figure 2:
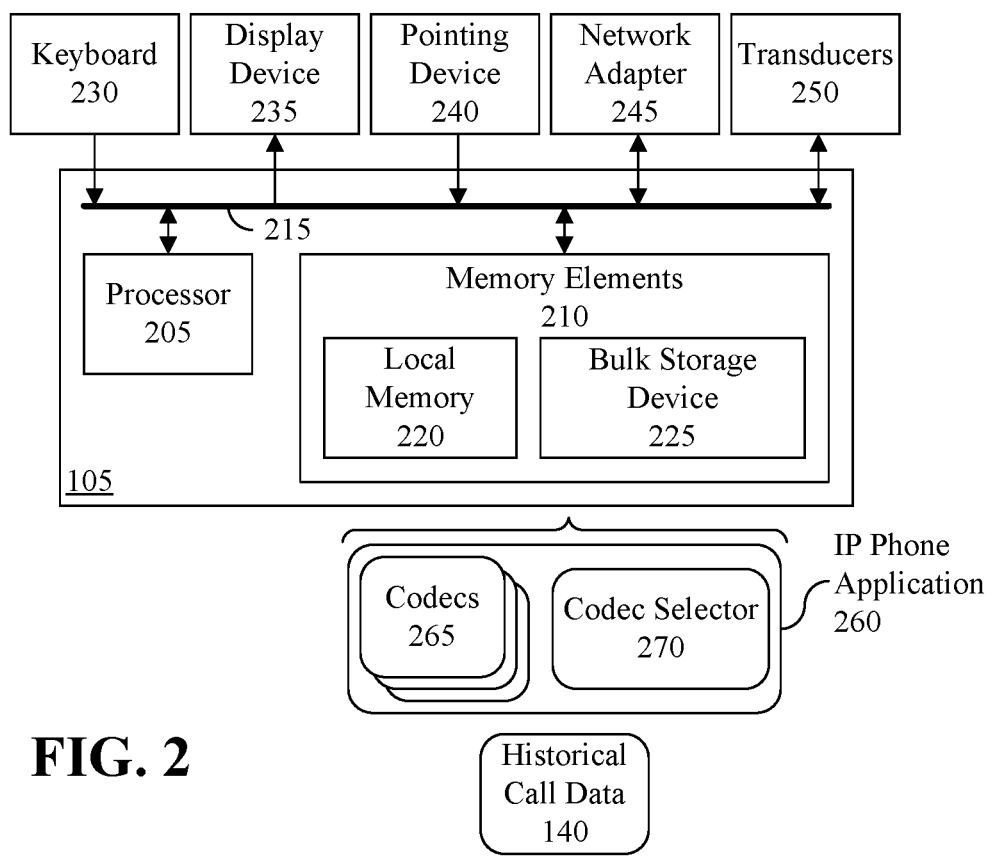
FIG. 2 is a block diagram illustrating an exemplary data processing system.

FIG. 2 is a block diagram illustrating an example of IP phone 105 of FIG. 1. IP phone 105 can include at least one processor (e.g., a central processing unit) 205 coupled to memory elements 210 through a system bus 215 or other suitable circuitry. As such, IP phone 105 can store program code within memory elements 210. Processor 205 executes the program code accessed from memory elements 210 via system bus 215 or the other suitable circuitry.

In one aspect, IP phone 105 is implemented as a computer or other programmable data processing apparatus that is suitable for storing and/or executing program code. It should be appreciated, however, that IP phone 105 can be implemented in the form of any system including a processor and memory that is capable of performing and/or initiating the functions and/or operations described within this disclosure. Further, IP phone 105 can be implemented in any of a variety of different form factors including, but not limited to, a portable device such as a mobile communication device, a tablet computing, a laptop computing device, a desktop computing device, telephone handset, or the like.

Memory elements 210 include one or more physical memory devices such as, for example, local memory 220 and one or more bulk storage devices 225. Local memory 220 refers to random access memory (RAM) or other non-persistent memory device(s) generally used during actual execution of the program code. Bulk storage device(s) 225 can be implemented as a hard disk drive (HDD), solid state drive (SSD), or other persistent data storage device. IP phone 105 also can include one or more cache memories (not shown) that provide temporary storage of at least some program code in order to reduce the number of times program code must be retrieved from bulk storage device 225 during execution.

Input/output (I/O) devices such as a keyboard 230, a display device 235, and a pointing device 240 optionally can be coupled to IP phone 105. The I/O devices can be coupled to IP phone 105 either directly or through intervening I/O controllers. One or more network adapters 245 also can be coupled to IP phone 105 to enable IP phone 105 to become coupled to other systems, computer systems, remote printers, and/or remote storage devices through intervening private or public networks. Modems, cable modems, wireless transceivers, and Ethernet cards are examples of different types of network adapters 245 that can be used with IP phone 105.

It should be appreciated that depending upon the particular implementation and/or form factor of IP phone 105, various element such as keyboard 230, display device 235, and pointing device 240 may be implemented as separate physical structures or implemented in a more integrated manner using, for example, a touch screen interface. A touch screen interface can function as a keyboard, a display device, and a pointing device.

IP phone 105 further includes, or is coupled to, one or more transducers 250. Transducers 250 include a transducer such as microphone configured to convert sound into audio data signals that may be processed by IP phone 105 and, more particularly, processor 205. Transducers 250 further include a transducer, such as a speaker, configured to, convert audio signals into sound.

As pictured in FIG. 2, memory elements 210 store IP phone application 260. IP phone application 260, being implemented in the form of executable program code, is executed by IP phone 105 and, as such, is considered an integrated part of IP phone 105. IP phone application 260, when executed by processor 205, causes IP phone 105 to initiate and/or perform the various operations described within this disclosure. In this regard, IP phone application 260, including any parameters and/or attributes utilized by IP phone application 260, are functional data structures that impart functionality when employed as part of IP phone 105 and/or network communication system 100.

In one aspect, IP phone application 260 includes one or more codecs 265 and a codec selector 270. Codecs 265 are implemented as program code executable by processor 205. Each of codecs 265, when selected and executed by processor 205, forms a device that encodes, decodes, or both encodes and decodes a signal such as a digital data stream. Each of codecs 265 may have parameters such as a bandwidth requirement, a latency, a sample period, a maximum achieved end user perceived quality. The parameters vary and/or differ from one of codecs 265 to another. In consequence of these varying parameters, using different ones of codecs 265 for a call will result in different MOSs for the call all other things being equal. More particularly, presuming that all factors for a network and the call are held constant except for the codec, each of codecs 265 will result in a different MOS. Codec selector 270 is configured to determine priority among different ones of codecs 265. For example, codec selector 270 determines the order of codecs specified in codec priority list 150 in accordance with any MOS and/or emulated MOS for codecs 265 as the case may be.

In the example shown in FIG. 2, IP phone 105 further stores historical call data 140 within memory elements 210. While historical call data 140 may be stored in a data storage device that is remotely located from IP phone 105, for example, as illustrated in FIG. 1, in another aspect, one or more portions or all of historical call data 140 may be stored locally within IP phone 105.

While IP phone 105 is illustrated as including a single processor, in another example, IP phone 105 can include a plurality of different hardware codecs whether implemented as multiple processors executing different codec program code or as different dedicated codec circuitry. In either case, codec selector 270 may be implemented as program code executing on processor 205. When executed, codec selector 270 determine an order for the different codecs available within IP phone 105. For example, codec selector 270 orders codec priority list 150. Other circuitry, whether a programmed processor, hardwired circuitry, bus, and/or combination thereof, is included within IP phone 105 to route a digital data stream to and/or from the appropriate codec for a call when selected for use.

While FIG. 2 is described as an example of an IP phone, it should be appreciated that the architecture of FIG. 2 also may be used to implement any of a variety of other data processing systems. For example, codec priority server 145 of FIG. 1 may be implemented using an architecture substantially similar to that described with reference to FIG. 2. The operational software and/or operating system of such an implementation would differ from an IP phone implementation. Further, as a server implementation, neither transducers 250 nor codecs 265 would be necessary.

Figure 3:
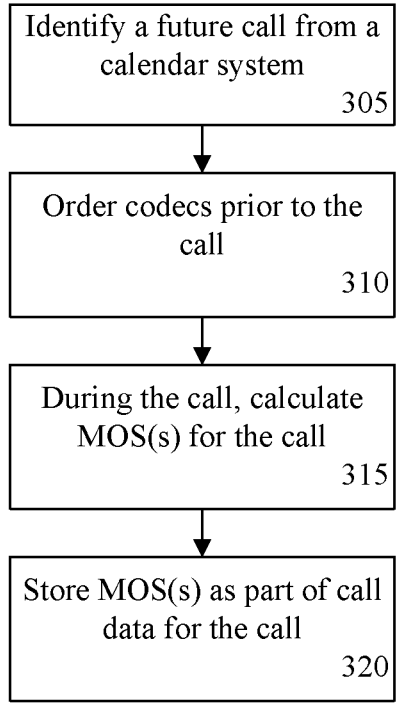
FIG. 3 is a flow chart illustrating an exemplary method of call processing.

FIG. 3 is a flow chart illustrating an exemplary method 300 of call processing. Method 300 can be implemented by a system such as IP phone 105 of FIG. 1 or a server such as codec priority server 145 of FIG. 1. In any case, the system has access to a calendar system of a user of the IP phone. Accordingly, method 300 can begin in block 305.

In block 305, the system identifies a future call from a calendar. The calendar that is accessed by the system is the calendar associated with the user of a particular, or selected, IP phone. In one aspect, the system identifies any calls within a predetermined amount of time into the future. For example, the system can identify calls within the next 1, 2, 3, 4, 5, 10, 15 minutes or the like. In identifying a call, any details specified in the calendar system for the scheduled call are obtained. The system, for example, can identify call data from the calendar system such as the call participants (e.g., calling and/or called parties), the particular type of IP phone being used by one or more or all call participants, the version of software and/or operating system being used by the IP phones of the call participants, location of call participants, date and time of the scheduled call, duration of the scheduled call, etc.

In block 310, the system orders codecs prior to the call. The system determines a priority among codecs that are available for usage by the IP phone prior to establishing the actual call. As noted, the IP phone includes a codec priority list. The system can determine an ordering of codecs for the codec priority list. The system determines the ordering of codecs according to a MOS associated with one or more codecs on the codec priority list. In one aspect, the MOS(s) for the codecs are determined from historical call data. In another aspect, the MOS(s) for the codecs are emulated MOS(s) determined from call emulations.

In block 315, during the call, the system calculates a MOS for the call. The MOS reflects the quality of the call using the particular codec that was selected for use during the call. In one aspect, calculation and/or determination of a MOS is performed in accordance with the ITU-T PESQ P.862 standard. The system can calculate the MOS one or more times during the call. For example, the system can calculate the MOS periodically, from time-to-time, responsive to particular events such as changing network metrics relating to delay, jitter, or the like. In any case, the calculated MOS accounts for conditions existing on the network while the call takes place using a selected codec.

In block 320, the system stores the MOS as part of the call data that is generated for the call. The MOS, or MOS(s), as the case may be, are stored with call data for the call. For example, the system can store the date and/or time of the call, network metrics such as packet loss, jitter, packet delay, call participants such as calling and/or called parties, the model of IP phones involved on the call for each participant, software versions for the IP phones of participants, the duration of the call, the codec used, and the MOS(s) calculated during the call.

In one aspect, multiple MOS can be combined, for example, by computing an average that is stored as part of the call data for the call. In another aspect, multiple MOS(s) can be stored as part of the call data for the call. Each MOS can be associated with a date and/or time stamp. Accordingly, a single call may be associated with multiple MOS(s), e.g., one MOS at each of a plurality of different times during the call, within the historical call data.

Figure 4:
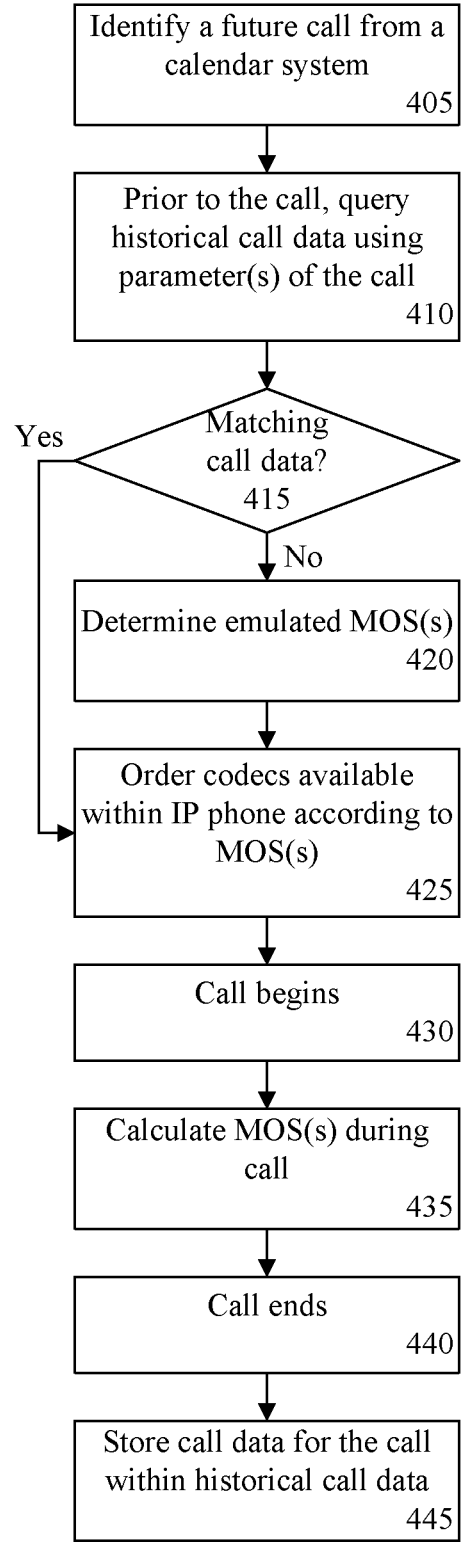
FIG. 4 is a flow chart illustrating another exemplary method of call processing.

FIG. 4 is a flow chart illustrating another exemplary method 400 of call processing. Method 400 can be implemented by a system such as IP phone 105 of FIG. 1 or a server such as codec priority server 145 of FIG. 1. The system has access to a calendar system of a user of the IP phone. Accordingly, method 400 can begin in block 405.

In block 405, the system identifies a future call from a calendar system. The calendar system is one that is associated with, or belongs to, a user of a particular IP phone. In block 410, prior to the call, the system queries historical call data using parameters of the call. The parameters of the call are determined from the calendar system. The parameters are utilized as arguments of the query applied against the historical call data. In block 415, the system determines whether the query result includes any matching call data. In the case where the system is a server, the server can provided the query result to the IP phone for processing. When the query result includes matching call data, method 400 continues to block 425. If not, method 400 proceeds to block 420.

In block 420, the system determines emulated MOSs for the various codecs available to the IP phone for use during the future call. In general, a call is emulated, but not actually implemented, for each of the codecs available for the future call. From the call emulations, a MOS is calculated for each codec. The resulting MOS is referred to as an "emulated MOS" since the MOS is calculated from an emulated call as opposed to an actual call.

In block 425, the system orders the codecs available within the IP phone according to the MOS(s). When the query yields a query result specifying matching call data, the matching call data specifies a codec and associated MOS for one or more codecs available within the IP phone for the future call. The matching call data may also specify a MOS for each codec available within the IP phone for the future call. When the query does not yield a query result that specifies matching call data, the MOS(s) used for ordering the codecs are the emulated MOS(s) determined in block 420.

In block 430, the call is started. The user of the IP phone, for example, either initiates the call or is called by another participant of the call. In establishing the call, the IP phone negotiates with the other IP phones or nodes on the call to determine a common codec that each participating IP phone or node can use. In performing the negotiation, the IP phone of the user traverses the codec priority list that is ordered in accordance with block 425. Thus, the particular codec utilized by the IP phone for the call is determined from the MOS(s) as previously described.

In block 435, during the call, the system calculates a MOS for the call. As discussed, the system can calculate a single MOS, calculate a MOS periodically, from time-to-time, responsive to predetermined changes in network metrics, or the like. For example, the system can calculate a first mean opinion score at a first time during the call and calculate a second mean opinion score at a second time during the call. The second mean opinion score is different from the first mean opinion score and the second time is different from the first time.

In block 440, the call ends. In block 445, the system stores the call data for the call within the historical call data. The call data for the call includes the MOS(s) determined or calculated for the call. In one aspect, when no matching call data is returned by the query result for the call, a new entry specifying the call data is created within the historical call data. In another aspect, when the query result does return matching call data, the call data is updated with the newly calculated MOS(s). As previously discussed, the call data for the call can specify a single MOS, multiple MOS(s), or a single MOS that is a function of multiple MOS(s) calculated during the call. For example, the MOS that is stored as part of the call data may be an average MOS for the call.

Figure 5:
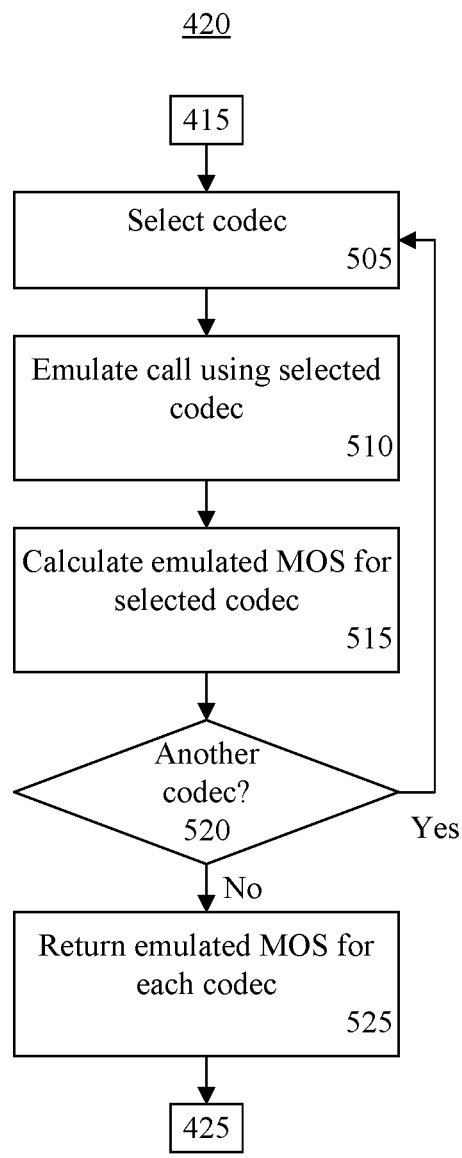
FIG. 5 is a flow chart illustrating an exemplary method of determining emulated mean opinion scores.

FIG. 5 is a flow chart illustrating an exemplary method 420 of determining emulated MOS(s). More particularly, FIG. 5 illustrates an exemplary implementation of block 420 of FIG. 4. Accordingly, FIG. 5 may be implemented by a system such as IP phone 105 and/or another node that supports call emulation responsive to instructions from a server such as codec priority server 125.

In block 505, the system selects a codec to be used for emulating a call. In block 510, the system emulates a call using the selected codec. It should be appreciated that since call emulation occurs within a predetermined amount of time prior to the scheduled call, the network metrics calculated as part of the call emulation are presumed to be the same as, or similar to, those that will exist when the actual call takes place. In one aspect, call emulation is performed by creating a virtual channel having parameters such as bandwidth, packet size, and the like that are the same as used by the selected codec. For example, the participating nodes exchange data that is formatted and corresponds to data that would be sent using the selected codec. The actual data may be dummy data, e.g., random data, used to "fill" payload space of packets that are sent. The system calculates network performance of the virtual channel by determining one or more network metrics such as packet delay, packet loss, jitter, available bandwidth, and the like.

In block 515, the system calculates a MOS for the emulated call. More particularly, based upon the network metrics determined using the selected codec for the virtual channel, the system calculates a MOS that is assigned to the emulated call, i.e., the virtual channel. As noted, the MOS calculated for an emulated call is an emulated MOS. In block 520, the system determines whether another codec remains to be used for emulating a call. If so, the method loops back to block 505 to select another, or next, codec for use in emulating a call. If not, the method proceeds to block 525. In block 525, the method returns the emulated MOS for each codec. The emulated MOS is used for purposes of ordering the priority codec list.

The inventive arrangements described within this disclosure facilitate the selection of a codec for a future scheduled call that is likely to provide the greatest perceived quality for the call by the participants. Codec selection can be performed by ordering the codec priority list of one or more IP phones using historical call data, emulated calls, or a combination thereof.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment disclosed within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method within an Internet Protocol (IP) phone, comprising:
    identifying, by the IP phone and from an electronic calendar associated with a user, a call scheduled for a future time;
    generating, using a first particular one of a plurality of codecs and anticipated network metrics of the call, a first emulated call and corresponding emulated mean opinion score (MOS) for the first emulated call;
    generating, using a second particular one of the plurality of codecs and the anticipated network metrics, a second emulated call and corresponding MOS for the second emulated call;
    ranking the first emulated call relative to the second emulated call based upon the corresponding MOSs for the first emulated call and the second emulated call; and
    initiating the call using a selected codec based upon the ranking.

2. The method of claim 1, wherein
the ranking generates a codec priority list of the plurality of codecs, and
the IP phone negotiates use of the selected codec using the codec priority list.

3. The method of claim 1, wherein
a MOS for the call is calculated during the call for the selected codec, and
the MOS for the call is stored within a data storage device including historical call data.

4. The method of claim 1, wherein
the MOS is calculated by:
    calculating a first MOS at a first time during the call, and
    calculating a second MOS at a second time during the call.

5. The method of claim 1, wherein
the plurality of plurality of codecs are obtained by:
    querying historical call data using a parameter of the scheduled call, and
    receiving a query result specifying the plurality of codecs.

6. The method of claim 5, wherein
the historical call data is queried prior to the emulating, and
the emulating is performed responsive to a determination that no call data from the historical call data matches the scheduled call.

7. A computer hardware system including an Internet Protocol (IP) Phone, comprising:
    a hardware processor programmed to initiate the following executable operations:
        identifying, by the IP phone and from an electronic calendar associated with a user, a call scheduled for a future time;
        generating, using a first particular one of a plurality of codecs and anticipated network metrics of the call, a first emulated call and corresponding emulated mean opinion score (MOS) for the first emulated call;
        generating, using a second particular one of the plurality of codecs and the anticipated network metrics, a second emulated call and corresponding MOS for the second emulated call;
        ranking the first emulated call relative to the second emulated call based upon the corresponding MOSs for the first emulated call and the second emulated call; and
        initiating the call using a selected codec based upon the ranking.

8. The system of claim 7, wherein
the ranking generates a codec priority list of the plurality of codecs, and
the IP phone negotiates use of the selected codec using the codec priority list.

9. The system of claim 7, wherein
a MOS for the call is calculated during the call for the selected codec, and the MOS for the call is stored within a data storage device including historical call data.

10. The system of claim 7, wherein the MOS is calculated by:
   calculating a first MOS at a first time during the call, and
   calculating a second MOS at a second time during the call.

11. The system of claim 7, wherein the plurality of plurality of codecs are obtained by:
   querying historical call data using a parameter of the scheduled call, and
   receiving a query result specifying the plurality of codecs.

12. The system of claim 11, wherein
   the historical call data is queried prior to the emulating, and
   the emulating is performed responsive to a determination that no call data from the historical call data matches the scheduled call.

13. A computer program product, comprising:
   a computer hardware storage device having stored therein program code,
   the program code, which when executed by a computer hardware system including an Internet Protocol (IP) phone, causes the computer hardware system to perform:
      identifying, by the IP phone and from an electronic calendar associated with a user, a call scheduled for a future time;
      generating, using a first particular one of a plurality of codecs and anticipated network metrics of the call, a first emulated call and corresponding emulated mean opinion score (MOS) for the first emulated call;
      generating, using a second particular one of the plurality of codecs and the anticipated network metrics, a second emulated call and corresponding MOS for the second emulated call;
      ranking the first emulated call relative to the second emulated call based upon the corresponding MOSs for the first emulated call and the second emulated call; and
      initiating the call using a selected codec based upon the ranking.

14. The computer program product of claim 13, wherein
   the ranking generates a codec priority list of the plurality of codecs, and
   the IP phone negotiates use of the selected codec using the codec priority list.

15. The computer program product of claim 13, wherein
   a MOS for the call is calculated during the call for the selected codec, and
   the MOS for the call is stored within a data storage device including historical call data.

16. The computer program product of claim 13, wherein the MOS is calculated by:
   calculating a first MOS at a first time during the call, and
   calculating a second MOS at a second time during the call.

17. The computer program product of claim 13, wherein the plurality of plurality of codecs are obtained by:
   querying historical call data using a parameter of the scheduled call, and
   receiving a query result specifying the plurality of codecs.

18. The computer program product of claim 17, wherein
   the historical call data is queried prior to the emulating, and
   the emulating is performed responsive to a determination that no call data from the historical call data matches the scheduled call.

* * * * *